Sept. 12, 1967 E. J. SUPERNOWICZ 3,341,854

MODULATING MAGNETIC RECORD TRANSFER MEANS

Filed April 30, 1963 4 Sheets-Sheet 1

INVENTOR.
EDWARD J. SUPERNOWICZ
BY John J. McCormack
ATTORNEY

Sept. 12, 1967 E. J. SUPERNOWICZ 3,341,854

MODULATING MAGNETIC RECORD TRANSFER MEANS

Filed April 30, 1963 4 Sheets-Sheet 4

3,341,854

MODULATING MAGNETIC RECORD TRANSFER MEANS

Edward J. Supernowicz, San Jose, Calif., assignor to International Business Machines Corporation, New York, N.Y., a corporation of New York Filed Apr. 30, 1963, Ser. No. 276,953
4 Claims. (Cl. 346—74)

The present invention relates generally to magnetic transfer systems and, more particularly, to transfer systems in which the size and spacing of the magnetic images is modulated.

In processes for magnetically recording digital information for application in data systems, workers in the art commonly provide for transfer means whereby magnetic images constituting the information are transferred from one magnetic record medium to another. Such transfer means may serve to create a duplicate magnetic record, thereafter to be read out at another time or place. However, it is desirable to be able to modify the spacing between bit-images, as well as transfer the images, for instance where one wishes to compress or expand a magnetic record. There is no prior art means of effecting such simultaneous transfer and spacing-modulation. The present invention does this.

With conventional magnetic recording techniques, it has long been known that the recording process is capable of much higher resolution than the readback process. Hence, high recorded bit-densities offer a readout problem. To achieve higher and higher recording densities, therefore, workers in the art must either decrease the effective reading-gap of the head so as to position the transducer closer to the record than in the write-mode, or in some other manner expand the recorded magnetic images during the reading process. Head gap dimensions have reached an almost irreducible minimum for magnetic recording and, hence, leave little room for further improvement here for high resolution readout. The instant invention provides a higher resolution readout without decreasing the head-to-medium gap by physically expanding the spacing between recorded bits on a transfer copy medium. Moreover, it does so without altering the quality of the original recording. The manner in which the invention does this is extremely simple, involving merely speed differentials between the moving record medium, the moving copy medium, and the transfer transducer at the point of transfer. The speed differentials are two-fold, involving speed differences between all three transfer elements: record medium, copy medium and transfer-field means.

Another related problem to readout of high bit-densities is bit resolution after transfer. When data is conventionally transferred from one magnetic record to another, it has characteristically suffered a loss in resolution from prior art transfer systems. This means that the duplicate created suffers from a loss in bit-resolution or inherent magnetism relative to bit-spacing. The present inventive transfer system prevents such losses and even allows an increase in resolution.

The present invention is able to produce a magnetic record having equal or higher resolution than the original recording. The invention does this by modulating inter-bit spacing independent of bit-strength.

Magnetic recording techniques have long been faced with the problem of increasing recorded bit density. A vast amount of time and research money has been spent in attempting to increase bit-density and has produced solutions which have involved such expensive and difficult-to-produce expedients as closer head-to-record spacing, larger heads carrying a higher flux density, and more costly record media having improved magnetization characteristics. The present invention offers a means for increasing bit densities without requiring any of the above difficult and costly expedients, and, by the mere provision of a differential velocity transfer process, it compresses data while transferring it according to the inventive spacing modulation effect.

The inventive system operates according to a new method of magnetic transfer whereby it achieves this modulation (compression or expansion) of the bit, or track, packing density in a magnetic recording. One aspect of the method comprises using an attenuated external field from an electromagnet, superimposed normal to a recorded medium moving unidirectionally with an unrecorded (copy) medium, but at a different speed. The two media pass in magneto-coupled relationship at the transfer point. Alternatively, the magnet may be moved while one of the media is kept motionless. As a result, the magnetization pattern produced on the copy images the original pattern, but is "spacing-modulated" according to the differences in the speed of the elements. Thus, by regulating the speeds of the copy, the record, and the magnet so that all speeds are different, one being zero, a wide range of bit and track packing densities can be produced. Expansions from 2:1 to 20:1 and compressions of 2:1 and 10:1 have been achieved.

One useful application of the inventive spacing-modulating technique is for a magnetic record which is recorded with a conventional recording head, for example in a 100 bits×100 tracks-per-square-inch ($10^4$ bits) pattern. The invention can facilitate compressing this low resolution recording, for instance, to 1000 bits×1000 tracks-per-square-inch ($10^6$ bits), onto a magnetic chip for storage. To conveniently read back this high resolution recording, the pattern is readily expanded with the invention back to its original (100 bits×100 tracks) lower density.

It will be seen that the system taught herein provides a means of non-destructively duplicating a high density magnetic recording on a copy surface in the form of a low density spacing-modulated recording. Conversely, bit-spacings may also be compressed by the invention. It provides a non-contact, surface-to-surface transfer and is simple to implement, extremely fast, and does not physically wear the surfaces of the media. Thus, the invention permits a high density recording process to be used for the storage mode of a system while the bit-expanding transfer means can produce a low-density copy medium for routine data handling, i.e., sorting, merging, selecting, searching, input and output, etc. The invention will thus permit the manipulation of high density information with conventional equipment that is presently incapable of handling it.

It is therefore an object of the present invention to provide a magnetic transfer process involving a speed differential between the copy and the original medium.

A further object is to provide a magnetic transfer process involving a speed differential between the copy and the original medium and the transfer transducer.

Another object is to provide a system for modulating magnetic bit density according to the relative velocities of media in a magnetic transfer system.

A further object is to provide a system for modulating magnetic bit resolution according to a simple speed differential in a transfer system.

Yet another object of the present invention is to provide a simple transfer means for modulating bit-spacing wherein data can be expanded or compressed according to the relative velocities of each of the magnetic media and of the transfer transducer.

Yet another object is to provide a system for bit compression and bit expansion, both by simply adjusting the motor speed modulation means, associated with the equipment for transporting the media, and the transfer transducer.

Still another object is to provide means whereby magnetic image-spacings may be expanded or compressed simply by increasing or decreasing the speed of the copy medium at the transfer station.

The foregoing and other objects, advantages and features of the invention will be apparent from the following particular description of the preferred embodiments particularly described in the following specification, taken in conjunction with the accompanying drawings, wherein.

Figure 1:
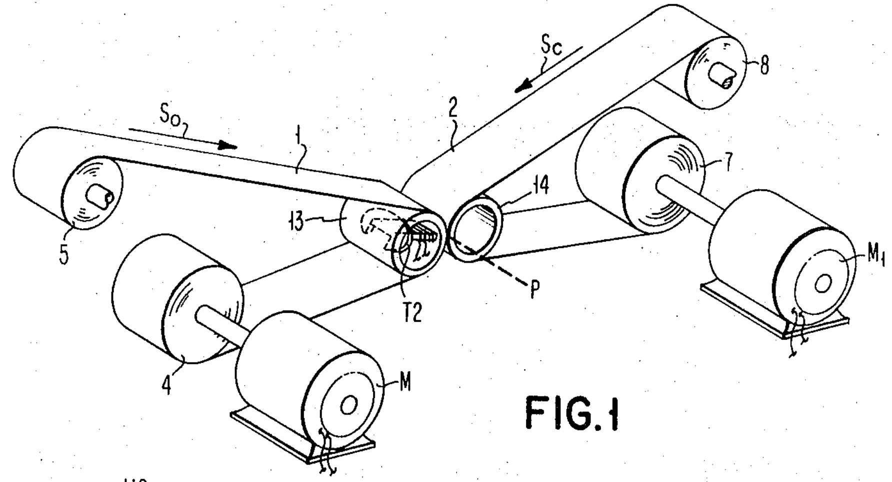
FIG. 1 shows, schematically, a simple embodiment of the invention involving simply means for differentially transporting the original and copy media past the transfer station.

In the illustration shown in FIG. 1, there appears a simple, schematic embodiment of the inventive system which serves to clarify its basic mode of operation. Here, there are shown two magnetic media comprising original tape 1 and copy tape 2, being moved at different linear speeds by motors M and M′, respectively, operating through pickup rollers 4, 5 and 7, 8, respectively. Tape 1 may comprise any pre-recorded magnetic tape. For instance, it may have a remanance of from 1,000 to 10,000, and a coercivity of from 500 to 1000 oersteds. Tape 2 is similar to tape 1 except that it should have a lower coercivity, for instance from about 100 to 500 oersteds. The lower coercivity of copy tape 2 aids the switching of the magnetic domains therein, and thus facilitates the transfer process from original tape 1 of the magnetizations (bits) therein.

The mere contact of original 1 with copy 2 at tangent P may, through inherent-magnetism of original 1, be sufficient to induce a readably-large magnetic impression on copy medium 2. But the invention includes, additionally, in all embodiments herein, a transfer transducer T located, for instance, within transfer drum 13. Transducer T produces a unidirectional magnetic field normal to both magnetic tapes 1 and 2 at their point of tangency, passing through them and thus enhancing the switching of tape 2 to produce a practically sensible magnetic image therein. While transducer T here comprises a magnetic probe-head, the transfer field may also be generated by an electromagnet or a permanent magnet within either drum, i.e., in drum 13 or drum 14.

With this embodiment, one may demonstrate how the invention achieves bit-expansion for easier readout of a high density magnetic record (e.g., tape 1). Here, it is presumed that the area of the magnetic image constituting the recorded bit on magnetic record 1 is too small to effectively sense during readout using conventional equipment. Therefore, it is desirable to expand the bit-areas and inter-bit spacings to facilitate bit-sensing thereafter. Such bit expansion is achieved, according to the invention, by merely moving the copy tape 2 at a faster speed than original tape 1 at the point of transfer. This point corresponds to the line P, the line of tangency, or nearest-tangency, between transfer rollers 13 and 14. Rollers 13 and 14 may be spaced to allow a transfer gap between original 1 and copy 2 varying from 0 to 0.0005 inch. It will be recognized by those skilled in the art that an image of a magnetic domain in original tape 1 will be induced in copy tape 2 as original tape 1 moves thereby in magnetic-coupled relation thereto, the inherent magnetism of 1 being sufficient, supplemented by transfer-flux from transducer T, to switch the lower coercivity magnetizations in copy tape 2, given close enough proximity thereto.

This magnetic transfer is the basis upon which the inventive teaching operates to achieve record modulation, i.e., expansion or compression of the record. This modulation results simply from speed differences between all three operative transfer elements, the original, the copy and the transducer, one of which is kept motionless. In this embodiment, the bit-expansion achieved is effected by moving the copy 2 substantially faster, past transfer point P, than original 1, while keeping transducer T "effectively" motionless, i.e., in a constant field attitude. Keeping transducer T stationary provides a constant transfer-flux normal to tapes 1 and 2. The required characteristics of the transducer T are further delineated in the description of FIG. 2 below. As will be explained more particularly below, the faster speed of copy tape 2, e.g. about 300 in./sec., expands the information on original tape 1 traveling slower therepast, e.g., at about 100 in./sec.

Alternatively, it will be realized that if copy tape 2 is reduced in speed so that its speed is substantially less than that of original tape 1, the copy images and the spacings therebetween will be narrower and smaller than those of the original, resulting in bit-compression. Thus, expansion or compression of the transferred image may be adjusted simply by adjusting the speed of the copy tape 2 which, in turn, is adjusted by controlling the speed of motor M′ which drives tape 2. There is nothing in the prior art which can so simply modulate bit density and bit sizes.

Figure 2:
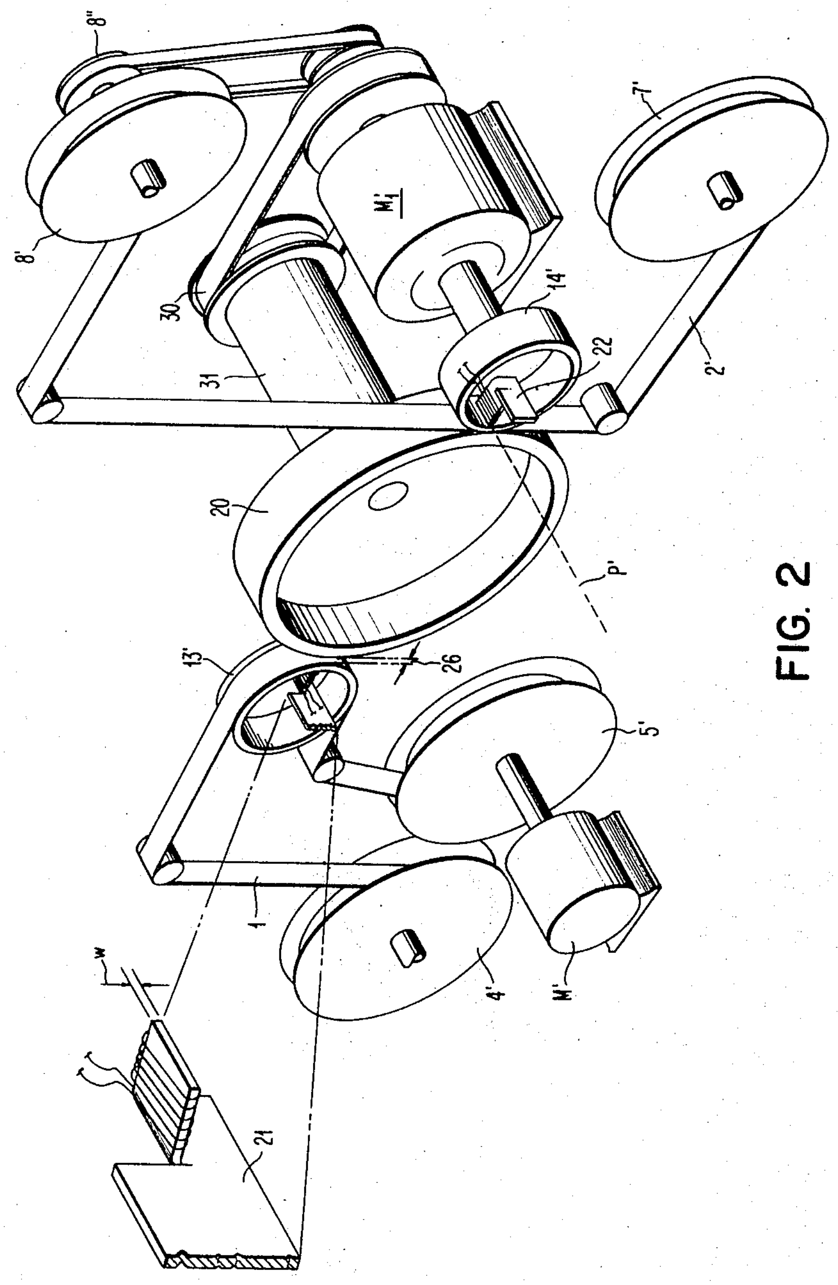
FIG. 2 shows another embodiment of the invention similar to that of FIG. 1, using plural transfer stations and transfer transducers with a buffer storage drum therebetween and in combination therewith.

FIG. 2 shows transfer-field transducer means 21, 22 alternative to that shown in FIG. 1, as well as an alternative mode of manipulating tapes (1′, 2′) while inserting a buffer storage drum 20 therebetween. The instant embodiment is operatively described as performing a compression of bit density from the original tape 1′ to copy tape 2′ according to the inventive teaching, but it may also be operated to expand bit-density, as will be apparent.

In FIG. 2 there is a broad similarity of elements to the embodiment shown in FIG. 1. For instance, original tape 1′ comprises a high-density magnetic storage tape, for instance, recorded with about 10,000 bits per inch and having similar magnetic characteristics to tape 1 in FIG. 1. Tape 1′ is pulled past the transfer point adjacent air gap 26 by motive means M′ pulling take-up reel 5′ which unrolls the tape from supply reel 4′, pulling it over roller 13′, past the transfer gap 26 in magneto-coupled transfer relation to the magnetizable surface of drum 20. It will be apparent that motor M′ may be controlled to effect data-compression by driving original tape 1′ at a relatively higher linear speed than drum 20 driven by copy motor $M_1'$. Air gap 26 is provided to eliminate the frictional contact between 1' and drum 20, although this is not absolutely necessary. In fact, drum 20 may even frictionally drive tape 1' in an alternative configuration, eliminating the need for motor M'. Gap 26 must be small enough so that tape 1' can be magneto-statically-coupled to the magnetizable surface of drum 20 and should be on the order of 0 to 0.0002 inch.

Copy tape 2' is likewise similar to tape 2 in FIG. 1 in magnetic characteristics. Tape 2' is driven over roller 14' by motor $M_1'$ and wound into take-up reel 8' which, through attached friction drum 8'', is belt-driven by motor $M_1'$. The transfer from buffer drum 20 to copy tape 2' is accomplished at a second transfer point tangent to line P', which point of tangency provides an efficient "magnetic-contact" transfer, the two media passing in magneto-coupled relation there. Drum 20 serves, here, as a buffer-transfer only, transferring the compressed image of the magnetization-bits on original 1' to copy 2' unmodulated, drum 20 and copy 2' passing transfer point P' at the same linear speed.

Transfer head 21 improves the readout signal transferred from tape 1' to drum 20 by applying an enhancing transfer flux normal to the recording tape 1' and the magnetizable surface of drum 20 at the transfer point, i.e., nearest proximity. Head 21 is a probe type transfer head. It is preferably made of M-metal material as is known to those skilled in the art and wound with 500 turns for 50 milliamperes current.

Probe 21 is long enough in its cross-sectional length to cover the required record-width, e.g., the number of track-widths to be compressed, being about 0.500 inch in this embodiment. More critical, however, is its width (or probe aperture), *w*, since it has been found that if *w* exceeds a maximum of about 0.010 inch, the inventive effect cannot be satisfactorily rendered. Experimentally, it has been determined that aperture-widths on the order of 0.020 inch, and higher, yield poor copy records. Hence, one should preferably maintain width *w* in the range of from about 0.002 to 0.005 inch. This will, of course, apply for all probe transducers, such as 21 or 22 in FIG. 2; transducer $T_2$ in FIG. 1; $T_{10}$ in FIG. 7; 86 in FIG. 10, etc.

The internal interaction of the vertical field with the field that emanates from the recorded magnetization in the media is not completely known; however, it is believed that unless this "transfer aperture" *w* is kept narrow, the uniform field produced from widening the transfer-aperture will deter the switching of the "image-magnetization" in the copy surface before and after the transfer point. This may be better understood by analogizing to photo-image copying methods wherein stray light on either side of the exposure aperture at the copy station will introduce unwanted "light-noise" at the periphery of the copied image of the optical record.

Theoretically, a narrow probe-aperture *w* will assure that the transfer field emanating from the transducer is a field with a sharp flux gradient, i.e., having an abrupt change of polarity and/or intensity. The field should further exhibit a large vertical field component. That is, the transducer should be arranged so that the transfer field superimposes a large vertical field normal to the surface of both the copy and original media to enhance the switching at a greater depth of magnetization in the copy surface within a narrow region. This narrow region is characterized as a "field aperture" dimension and is analogous to probe-aperture dimension *w*.

Experimental evidence has shown that only a vertical field of this narrow aperture, having a sharp transition in field strength, is suitable to produce the compression and expansion of the invention. External fields of uniform field distribution produced from Helmholtz coils were tried. Such coils are conventional for magnetic transfer, but when they were superimposed upon the magnetic surfaces in several directions, they failed to compress or expand magnetic images according to the invention.

An alternative form for the head 21 would be a permanent magnet providing this sharp, attenuated enhancing flux. Such permanent magnetic material might suitably take the form of a permanent probe magnet within drum 13'. Transfer head 22 is identical in construction and operation to head 21, aiding the transfer from drum 20 to tape 2'.

Since buffer drum 20 has been provided between the two media 1' and 2' for low-to-high density transfer-modulation and, therefore, would be rotated by motor $M_1'$ at a linear speed substantially less (for instance, one-fifth) that of original tape 1', it is obvious that the separation 26 eliminates much troublesome friction between the two. Drum 20 is coated with an ordinary magnetizable coating such as a plating of 80% cobalt-20% nickel, 0.002 inch thick, of 1,000 to 10,000 oersteds remanance and 200 to 400 oersteds coercivity. In this bit-compressing embodiment, it is evident that the bit-density on buffer drum 20 will be higher (for instance, about 10,000 bits per inch) than that of original tape 1' (e.g., 2,000 bits per inch). Drum 20 also aids in driving the copy tape 2' past the copy transfer station at tangent P' and may also be used for other purposes such as buffer storage. It will be apparent to those skilled in the art that the tape media can also take the form of discs, drums, unit records and equivalent media in the magnetic recording arts.

As to the operation of this alternative transfer system, it will be understood that the individual magnetized spots, or bits, which are recorded in an expanded state on original tape 1', will induce magnetic images on the magnetizable surface of buffer drum 20, the images being made narrower according to the lower velocity of drum 20 and being transported therefrom with no further modulation to copy tape 2' at tangent P'. At point P', where the magnetic contact recording transfer of these images to copy tape 2' takes place, as described above, the bit-density is substantially the same since the copy tape is traveling at the same speed as drum 20. However, copy tape 2' may be mechanically arranged to travel faster than drum 20 according to any further bit expansion desired and may thus provide a two-stage bit-compression system.

It will be evident from the above that a salient advantage of the invention is that conventional recording means may be used to produce magnetic records of greater bit-density than was heretofore possible. In such a case, the magnetic image would simply be written, for instance, on original medium 1 with a conventional transducer and transferred to copy medium 2 by the differential speed magnetic-transfer system described above; namely, decreasing the speed of copy medium 2 substantially below that of original medium 1. This will allow the creation of magnetic records having higher bit-density and greater compression of data than conventional means will presently allow, without changing a single element of conventional recording and transfer systems. No bit-compression techniques of the prior art can compare in simplicity and convenience to this technique.

It should further be noted, as is more particularly described below, that such bit compression, or conversely, bit expansion, need not involve any loss in the resolution, especially when used with transfer transducers such as those shown in FIG. 2. The readout resolution of the instant invention is equal or superior to that of the original data, as for instance, as shown in the readback waveforms of FIG. 6 below.

It has been mentioned that the above embodiments may be modified to co-operate with recorders and increase bit-density by the inventive bit compression-transfer mode. For this, the invention may be adapted to connect to present magnetic recording systems as a "bit-density-increasing" attachment thereto. This "attachment aspect" is more clearly shown by the embodiment in FIG.

Figure 3:
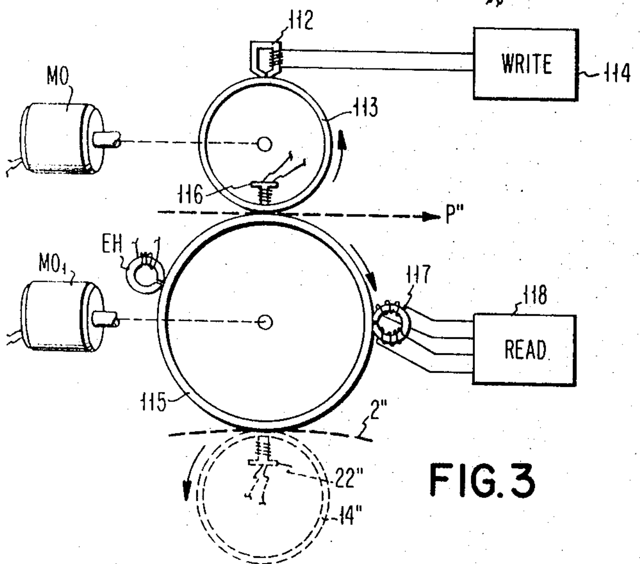
FIG. 3 shows a third embodiment of the invention similar to that of FIG. 2 but wherein the magnetic media comprise magnetizable drums spinning at different relative velocities.

3. FIG. 3 shows schematically a write-drum 113 having a conventional, magnetizable surface and being driven rotatably by motor MO, the speed of which is adjustably controllable. Magnetic signals, or bits, are written conventionally by ring transducer 112 upon the magnetizable surface of drum 113 in response to signals from write control 114. Copy drum 115 similarly has a magnetizable surface and is driven by motive means $MO_1$ which is also adjustable so as to controllably rotate copy drum 115 at copy-speeds substantially different from the write-speed of write drum 113 and thereby accomplish the differential speed transfer-modulation according to the invention. It will be evident from the foregoing that if drum 115 is rotated at a speed substantially less than that of drum 113, the dimensions of the magnetic bits will be compressed upon copy drum 115 and thus radically increase bit density thereon according to the degree of speed differential.

As in FIG. 2, transfer head 116 is provided to direct a normal enhancing flux against the magnetizable surfaces of drums 113 and 115. These surfaces are brought into tangency along tangent P″ so as to pass in magnetostatically-coupled relationship and will, with the assistance of the flux from head 116, thus induce a recognizable magnetic image of the bits on write drum 113 upon the surface of copy drum 115 according to a magnetic transfer effect.

At this point, it will be apparent that the mere introduction of adjustable speed drum 115 into the writing system can, per se, substantially increase the bit-density-capability of conventional magnetic recording systems, such as transducer 112 and drum 113. The compressed signals may, of course, be read out or transmitted in any conventional, convenient manner. For instance, from read head 117, the "bit-compressed" signals may be transmitted to remote points in their high-density state, e.g., for more efficient utilization of high-speed transmission means. A tape transfer means such as those shown in FIGS. 1 and 2 may also be provided to transfer the compressed images from copy drum 115 in a conventional manner, using the magnetic contact transfer process for this, as well. Such a tape transfer means is indicated in phantom and comprises copy-tape 2″, a contact roller 14″ and transfer transducer 22″. It will be further apparent that, although it is not necessary, an erase head EH may be provided as shown to erase the surface of copy drum 115 and prepare it for a second copy-revolution.

Figure 4:
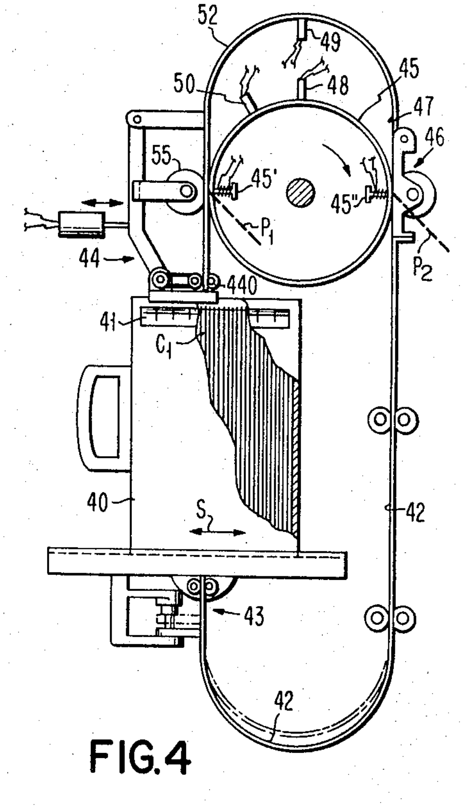
FIG. 4 is a side elevation, in perspective, of an embodiment similar to that in FIG. 3 wherein magnetic unit records are substituted for one of the magnetic drums.

It will be apparent to those skilled in the art that the magnetic media such as the drums and tapes shown in FIGS. 1–3 may alternatively comprise unit record media, such as those shown in FIG. 4. The unit records shown in FIG. 4 comprise magnetic chips or strips, such as $C_1$, having magnetizable material on at least a portion thereof and on one or both sides thereof. The chips are stored in a pluggable strip file or cartridge 40 having a strip-retaining clip 41 to resiliently maintain the chips within the body of the cartridge until selected and ejected therefrom by strip-eject means 43. It will be apparent to those skilled in the art that the relative lateral motion along arrow S of the cartridge 40 will position eject means 43 so as to be able to pick and eject a particular strip and present it in transport relation to strip feed means 44. Feed 44 comprises a pair of rollers 440 having a prescribed linear velocity and adapted to transport a magnetic strip upwardly towards the "strip-to-drum" transfer means 55 along guide 52. Strips such as $C_1$ may have magnetic information recorded thereon in a high density mode according to this embodiment, for instance at 10,000 bits per inch. The embodiment shown provides high-to-low density transfer-modulation whereby magnetic images of the information on the strips may be transferred to higher speed recording drum 45 according to the differential speed transfer of the invention and thereby expand bit spacing for practical readout. Strips such as $C_1$ are coated, as is known to those skilled in the art, with a magnetic material such as a magnetic oxide of 1,000 oersteds remanance and about 250 oersteds coercivity. High speed transfer drum 45 is provided with a conventional coating of magnetizable material, for instance having 10,000 oersteds remanance and 350 oersteds coercivity, similar to the drum 20 in FIG. 2 and drum 115 in FIG. 3 above. Transfer drum 45 is driven at a prescribed high speed velocity by a motor, the speed of which is adjustably controllable. For bit expansion in this case, the motor may be adjusted to rotate drum 45 at roughly five times the velocity of the chip, i.e., of the transfer roller 55 driven by a second motor. As with roller 13 in FIG. 1, drum 45 is provided with transfer flux generating means 45′ therewithin. This provides a flux normal to the chip at the transfer point along tangent $P_1$ and thereby enhances the magnetic image transferred to the surface of drum 45. Read-write head 48 associated with drum 45 serves to transmit the copied information, or modify and update it for later presentation to the same chip, or to a different chip, at the transfer point located by tangent $P_2$ on the opposite side of channel 52. Drum-to-strip transfer means 46 is provided at tangent $P_2$ so as to provide means for transferring information on copy drum 45 to a magnetic strip presented along guide 47 by the magnetic contact transfer process described above. Guide 47 provides a temporary storage station where a bit strip may rest during drum processing, for instance, for the updating of the copied information thereon. It will be apparent that read copy means such as that shown in FIG. 3, namely, tape 2″, etc., may also be provided for copying the images induced on copy drum 45 for the storage or further use thereof.

After leaving strip storage station 47, a strip will then return along flexible guide 42 to the select means 43 to be reinserted thereby in an appropriate position in cartridge 40.

This embodiment should point out to those skilled in the art that the differential speed transfer modulation system of the present invention may be applied to expand or compress unit magnetic records as conveniently as other magnetic media. Such unit record media is often advantageous, for instance in connection with information retrieval systems and the like, wherein it is undesirable to search a long, continuous record such as a tape, and inefficient to use a constricted, hard-to-manipulate drum surface for storing an extensive, irregularly accessed array of data.

Figure 5:
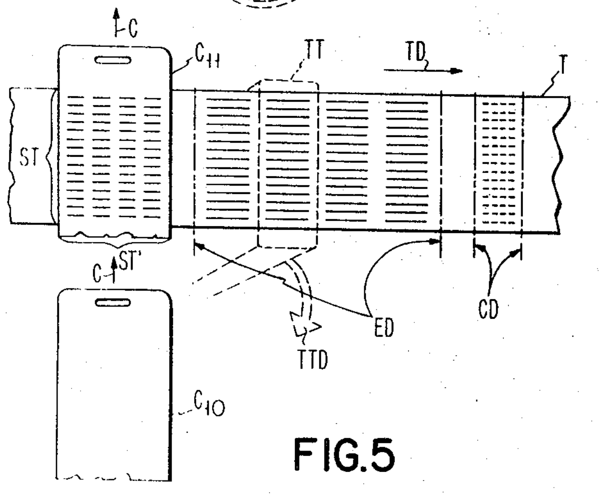
FIG. 5 is a schematic conceptual showing of the relative movement of the media in FIG. 4 and the magnetic images resulting therefrom, exemplifying a resolution modulation.

The format and transfer scheme of a chip-to-tape transfer embodiment alternative to the chip-to-drum transfer shown in FIG. 4 is schematically indicated in FIG. 5. Here, it will be recognized that magnetic chip records, such as chips $C_{10}$ and $C_{11}$, are actuated in the direction of the arrow C to the transfer station. This station is bounded by lines ST, ST′ across the magnetic tape record T. Tape T is moving in the direction of the arrow TD. Besides the change in media and in the transfer-relation thereof, it will be noted that this embodiment also modifies the mode of transfer. Here, transfer-modulation is effected by a "moving transducer" mode similar to that shown in FIG. 7 wherein the transfer-transducer TT, indicated here in phantom, is moved across the transfer station in the direction of the arrow TTD. Here, unlike the prior embodiments wherein both of the media moved relative to each other, only one of the media (tape T) is moving, the other chip ($C_{11}$) being motionless during the transfer mode, while the external enhancing transfer field means TT is moved at a different, slower linear speed. This effects a bit-expansion type transfer modulation (ED) of the invention during the transfer of magnetic information from the original record $C_{11}$ to the tape record T. From this schematic indication, as well as from a more particular consideration of this transfer mode in connection with the description of FIG. 7, it is apparent that the transfer-modulation of the invention may be achieved by causing any two of either the original medium, the copy medium, or the transfer transducer to move at different relative velocities. Expansion of the track size of the magnetic information on chip $C_{11}$ is indicated schematically at tape copy portions ED, while compression of the data (faster TT) is schematically indicated at portions CD along the surface of tape T.

Figure 7:
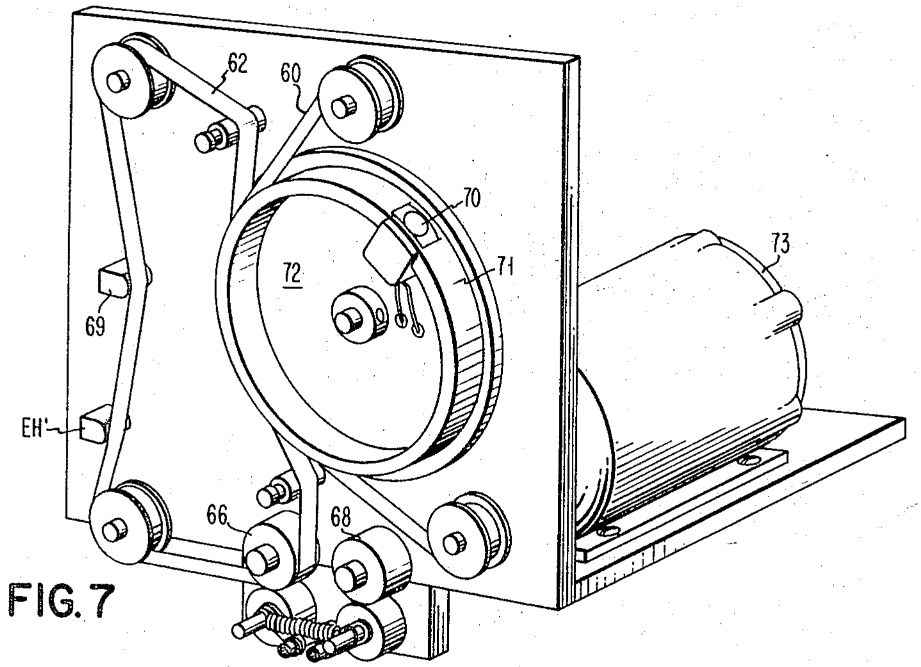
FIG. 7 is an elevational perspective side view of a further alternative embodiment of the invention utilizing a moving transfer-transducer.

This alternative transfer mode, using a moving transfer-transducer, is shown in FIG. 5 schematically and more particularly by the embodiment of FIG. 7. In this embodiment, as in FIG. 5, one of the magnetic records (tape 60) is kept motionless during transfer while the other record (tape 62)) is kept moving. The transducer means 70 is also moved but at a different linear velocity to that of copy tape 62.

Moving transducer 70 may be an electromagnet made of high permeable material, such as high mu-80 or mu-metal material and having cross-sectional dimensions on the order of 0.500 inch x 0.005 inch, like the probes above. It is rotated at about 1,000 r.p.m.'s within transducer drum 71. Magnet 70 is fixedly mounted in annular shoe 71 which comprises a spinning disc serving as a mounting frame for the magnet 70 and is fixedly mounted upon drum 72. Drum 72 is driven rotatably by motor 73. Motor 73 also drives copy roller 66 which drives the copy tape 62 at a linear speed different from that of magnet 70 at the transfer point. Either or both of the rotational speeds of roller 66 or disc 72 may be made variable (e.g., using a clutch and gear differential) as is necessary to conveniently arrange the speed differential. Roller 68 is provided to drive the original tape 60 but in a stepped-fashion, between transfer passes of the magnet 70. Thus, in any suitable manner, as for instance by lever means, moving roller 68 may be moved into frictional contact with tape 60. Thus, a stepping drive may be periodically and controllably provided for original tape 60. Read head 69 is provided to transmit the copied information from copy tape 62 to an external record or transmission terminal. An erase head EH' may also be provided in the transfer loop between the read head 69 and the transfer station so as to erase the copy tape 62, but this is not absolutely necessary. In this case also, it is preferable that the width of the transducer 70 in the direction of tape travel must be not more than about 0.005 inch, so as to maintain field-aperture below the prescribed minimum.

Figure 9:
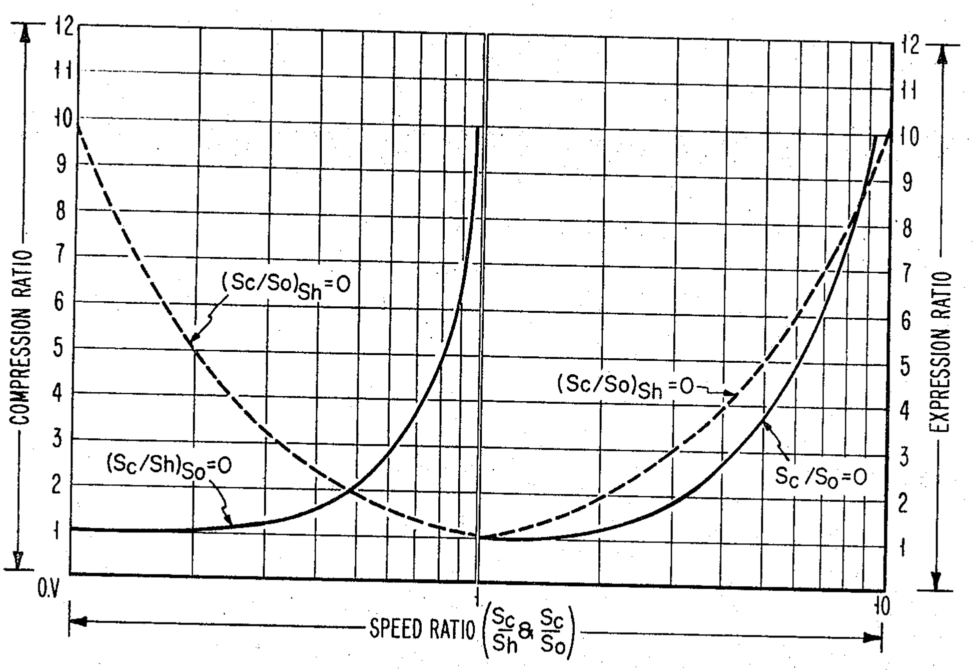
FIG. 9 is a scaled reproduction of experimental curves showing data compression-expansion effects as related to observed speed ratios between media and between a medium and a transducer.

The moving transducer mode of FIG. 7 achieves a somewhat different transfer-modulation effect than the stationary transducer mode of FIGS. 1–4. This is indicated in FIG. 9 which is a plot of speed ratios (i.e., the speed differences between the copy medium, the original medium, and the transducer) plotted against data compression/expansion effects (i.e., spacing modulation). It will be observed that for the stationary transducer mode represented by the dotted line curve (i.e., $S_h$ equals 0), the spacing modulation is practically linearly dependent upon the ratio between the copy speed $S_c$ and the original speed $S_o$. It will be observed that a simple rule may be generated whereby if one controls the speed of the original so as to increase it steadily from less than $S_c$ (e.g.

$$\frac{S_c}{S_o}=10$$

giving it almost 10 times "bit expansion") to more than $S_c$, one will gradually compress the data. This is followed on the dotted-line curve proceeding from right to left until one achieves maximum compression (in this case, about 10 times where $$\frac{S_c}{S_o}$$

is a minimum).

Interestingly enough, however, the moving transducer mode of compression is startlingly different in effect. This is evident from the solid line curve which is discontinuous at its midpoint $$\left(\text{where } \frac{S_c}{S_o}=1\right)$$

representing a virtually infinite compression for the case where the transducer speed $S_h$ and copy speed $S_c$ are roughly the same. Interestingly enough, too, here one can achieve roughly a 1:1 copy, or zero expansion/compression, at two zones on the curve, as opposed to one zone on the stationary transducer curve. These zones occur when the copy is moving just a little bit faster than the head and also when the head is moving very much faster than the copy. The bit compression effects and the manner of effecting them, according to the invention, which are evident from these curves, will be useful to those skilled in the art to achieve the data-modulation type transfer according to the instant invention. These may be used to achieve readily apparent advantages such as controlling bit expansion by merely adjusting a motor speed. As is evident to those skilled in the art, this is a far superior way of modulating bit spacings or sizes than what has been done heretofore.

Figure 10:
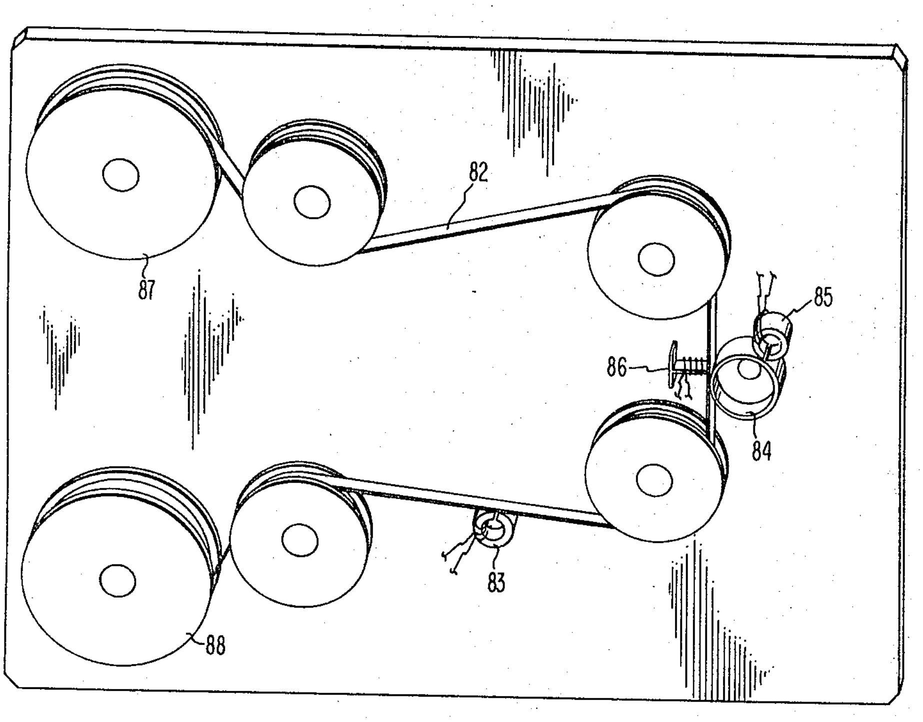
FIG. 10 is an elevational side-perspective of another alternative embodiment of the invention.

FIG. 10 shows an alternative transfer modulation embodiment wherein magnetic bits are transferred from an original tape record 82 to a buffer drum 84 to be read out therefrom by recording head 85 in a manner which is conventional in the art. As in the above embodiments, a transfer head 86 is provided to provide an external, normal transfer field of narrow aperture at the transfer point and enhance the transfer modulation of the magnetic bits from tape 82 to drum 84. This embodiment has been used by the inventors to illustrate the bit expansion and compression effects of bit spacings both from drum-to-tape and from tape-to-drum. The readback waveforms illustrating this appear in FIG. 6 and FIG. 8. The construction and inter-relation of magnetic tape 82, transfer head 86, and recording drum 84 are similar to those analogous elements described above, for example regarding FIG. 2. This drum-to-tape embodiment was used to derive the experimental waveforms represented in FIGS. 6 and 8, described below.

Figure 8:
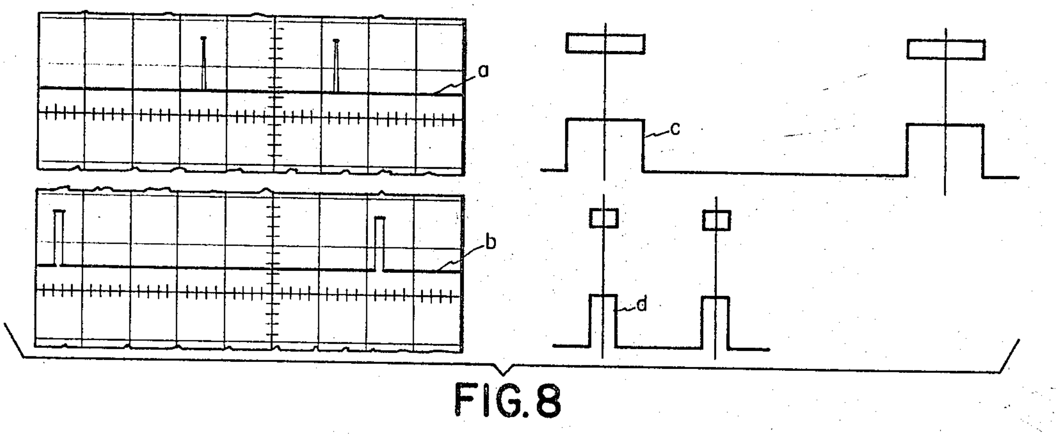
FIG. 8 is a scaled reproduction similar to that of FIG. 6.

In FIG. 8, curves *a* and *b* represent the actual waveforms constituting the readback signals before *a*, and after, *b*, the transfer modulation effected by the embodiment of FIG. 10, illustrating a track-compression effect. The magnetic bits were recorded on tape 82 with a ring head having a recording gap of somewhat less than one mil. The one-mil dimension is the narrow bit-dimension while the long dimension, or inter-bit spacing, is that of the track (bit track). The first waveform *a* is a readback signal of the original track pattern with a ring head such as head 83. The second waveform *b* is the feedback signal (e.g., with head 88) of the same recording after having been transfer/modulated by the inventive transfer system from tape 82 to drum 84. The modulation achieved here was a 3:1 bit compression. This compression can be seen schematically by comparing waveforms *a* and *b* or waveforms *c* and *d*, representing waves *a* and *b* in a scaled, idealized form.

Figure 6A:
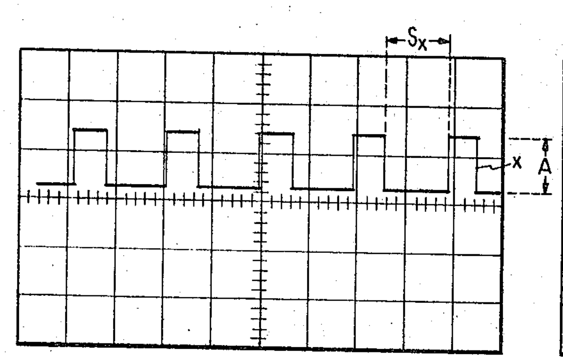
FIGS. 6A and 6B is a scaled reproduction of actual readback waveforms of the same magnetic information from records before and after the transfer involved, using the embodiment of FIG. 10, together with idealized versions of the waveforms.
Figure 6B:
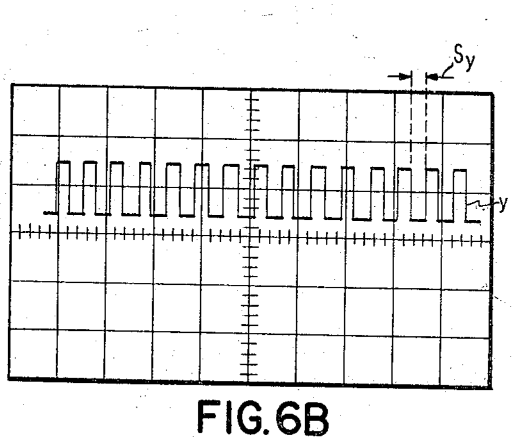

FIG. 6 is another scaled representation of photographed waveforms illustrating the modulation of bit size and spacing by the embodiment shown in FIG. 10. Here, the quantitative degree of spacing modulation $S_x$, $S_y$ is more graphically evident than in FIG. 8 and bit-compression rather than bit-expansion is evidenced. These waveforms illustrate tape readout in which one of the tapes (the transducer 86) is held motionless ($S_h=0$) while the original $S_o$ and the copy media $S_c$ are kept moving in the same directions, but at a speed difference of $$3:1\left(\frac{S_c}{S_o}=3\right)$$

The waveform *y* is a readback signal obtained, representing a transfer-modulated version of the original readback waveform curve *x*. Curve *x* has been compressed in bit size and spacing about 3:1 as the sealed illustration indicates. It is very significant to note, however, that although the spacings $S_y$ has been reduced to about a third of that of the original $S_x$, the amplitude A of the signal is still the same. This, then, is more than a mere "reduction" of the original record, as in the optical sense, but, in fact, constitutes a resolution modulation. This is an advantage which is perhaps unique in the art of bit compression. To analogize magnetic bit compression to the optical analog, the present transfer modulation technique does not merely reduce, or conversely, blow-up the recorded image, as might be done with an optically-magnifying system of lenses, but selectively magnifies or reduces only the lateral dimensions of the record, i.e., the size of and the spaces between the bits. Thus, an actual increase in effective resolution of data is accomplished.

It will be recognized that wide application of the instant invention may be made in magnetic transducing and transfer systems to enable them to modulate bit densities and data dimensions, as well as to improve resolution. Any such applications would necessarily include abutting a magnetic copy medium in magneto-coupled relation to a recorded medium at a readout station, placing a transfer-field generating transducer at the station so as to impress flux normal to said media, and moving all three elements at different linear speeds.

While there have been described and illustrated in the drawings, various structural embodiments and methods for magnetic transfer and modulation of data arrangement and dimensions in accordance with the invention, it will be appreciated that other various elements or steps may be used in accordance with the invention to modify or completely supplant the embodiments described above. Accordingly, the invention should be considered to include all modifications, variations and alternative forms falling within the scope of the appended claims.

I claim:

1. A magnetic transfer system of the transfer modulation type comprising:
  - a first magnetic recording medium;
  - a second magnetic recording medium arranged to pass into magnetically-coupled relation to said first recording medium at a transfer station;
  - said first and said second recording medium having a common tangent line at said transfer station;
  - movable transducer means in close proximity and supplying transfer flux normal to said first and said second recording medium at said transfer station to effect magnetic transfer from said first to said second recording medium; and
  - differential means for imparting a speed differential between said first recording medium and said transducer means and for additionally imparting a second speed differential, different from said first differential, between said second recording medium and said transducer means.

2. The combination as recited in claim 1 wherein said differential means comprises:
  - transducer transport means for cyclically passing said transducer into transfer relation with said first and said second recording medium at said station and which also includes reproduction transport means for imparting said second differential.

3. A magnetic copy system of the bit-density modulation type comprising:
  - first magnetic recording medium having magnetic information recorded thereon;
  - record transport means adapted to transport said first recording medium past a transfer station at a prescribed record speed;
  - second magnetic recording medium adapted to be magnetically switched by the magnetism of said information and thereby represent images thereof;
  - said first and said second recording medium having a common tangent line at said transfer station;
  - transfer means including copy transport means adapted to transport said second recording medium past said station in magnetically-coupled relation to said first recording medium at said transfer station at predetermined, variable copy speeds, said copy speeds being different from said record speed, whereby the dimensions of said information are modulated in said images; and
  - transfer field means supplying an attenuated transfer-flux through both said second recording medium and said first recording medium at said transfer station, whereby to enhance the modulated magnetic image of said information induced upon said second recording medium, said field means including:
    - a moving magnetic transducer;
    - in close proximity and supplying transfer flux normal to said first and said second recording medium at said transfer station to effect magnetic transfer from said first to said second recording medium; and
    - transducer transport means adapted to move said transducer past said transfer station, said transducer moving at a speed substantially different from said record speed and said copy speed.

4. A magnetic copy system of the bit-density modulation type comprising:
  - first magnetic recording medium having magnetic information recorded thereon;
  - record transport means adapted to transport said first recording medium past a transfer station at a prescribed record speed, said record transport means being arranged to incrementally drive said first recording medium past said station;
  - second magnetic recording medium adapted to be magnetically switched by the magnetism of said information and thereby represent images thereof;
  - said first and said second recording medium having a common tangent line at said transfer station;
  - transfer means including copy transport means adapted to transport said second recording means past said station in magnetically-coupled relation to said first recording medium at said transfer station at predetermined, variable copy speeds, said copy speeds being different from said record speed, whereby the dimensions of said information are modulated in said images; and also including
  - transducer means in close proximity and supplying transfer flux normal to said first and said second recording medium at said transfer station to effect magnetic transfer from said first to said second recording medium;
  - said transducer means including a movable magnetic transducer and transducer transport means adapted to drive said transducer past said station at prescribed variable transducer speeds.

References Cited

UNITED STATES PATENTS

| | | | |
|---|---|---|---|
| 2,170,751 | 8/1939 | Gabrilovitch | 179—100.2 |
| 3,120,001 | 1/1964 | Supernowicz | 346—74 |

OTHER REFERENCES

Haddad, J. A. and Supernowicz, E. J.: Storing Magnetic Information, IBM Technical Disclosure Bulletin, vol. 4, No. 11, April 1962.

BERNARD KONICK, *Primary Examiner.*

R. MORGANSTERN, *Assistant Examiner.*